O. E. MICHAUD.
AXLE.
APPLICATION FILED MAR. 14, 1911.

1,031,080.

Patented July 2, 1912.

Witnesses:
Edgar P. Farmer
G. A. Pennington

Inventor:
O. E. Michaud
By Carr & Carr,
his Attys.

UNITED STATES PATENT OFFICE.

ONESIME E. MICHAUD, OF ST. LOUIS, MISSOURI.

AXLE.

1,031,080.      Specification of Letters Patent.      Patented July 2, 1912.

Application filed March 14, 1911. Serial No. 614,472.

*To all whom it may concern:*

Be it known that I, ONESIME E. MICHAUD, a citizen of the United States, and a resident of the city of St. Louis and State of Missouri, have invented a new and useful Improvement in Axles, of which the following is a specification.

This invention relates to axles for vehicles and it has for its principal objects to produce a structure which will permit of the use of wheels having relatively short or narrow hubs and also resist and overcome torsional strains upon the hub and antifriction bearings provided therein, to provide for taking up end play in the bearing, and to attain certain other advantages hereinafter more fully appearing.

The invention consists in the parts and in the arrangements and combinations of parts hereinafter described and claimed.

Figure 1:
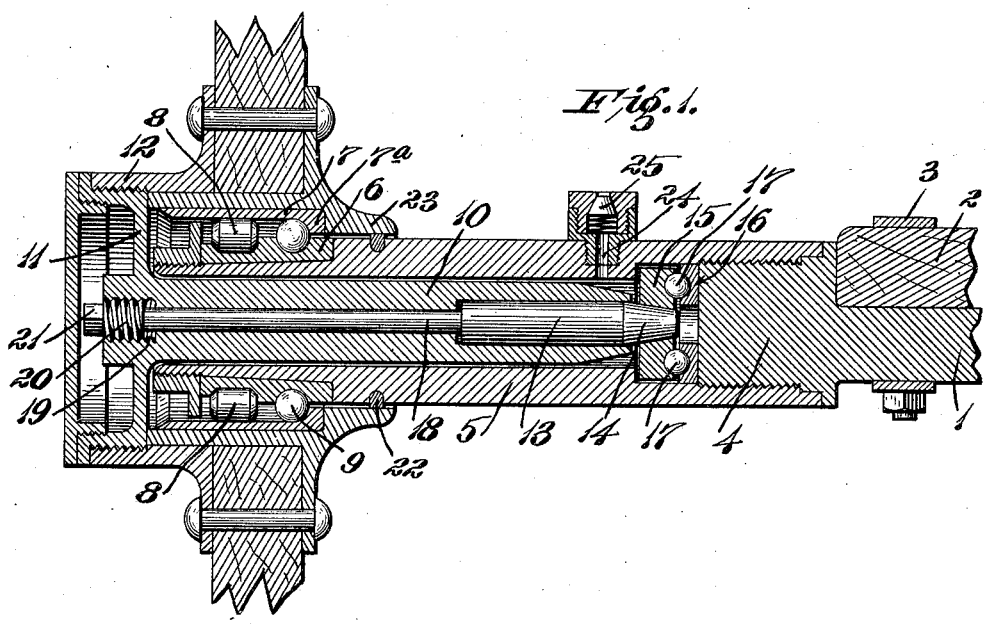
Figure 2:
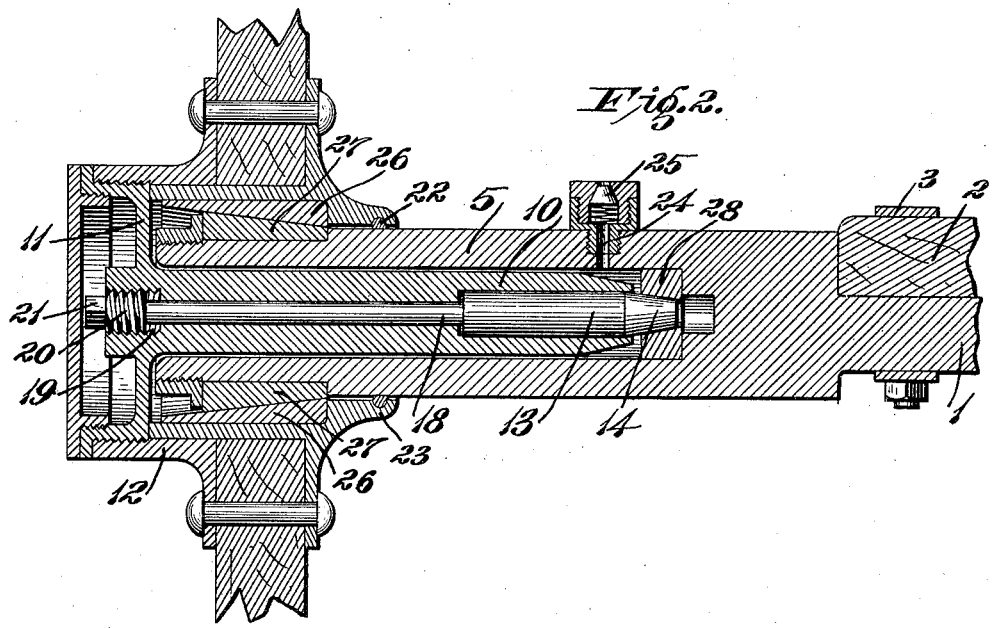

In the accompanying drawing which forms part of this specification and wherein like symbols refer to like parts wherever they occur,—Figure 1 is a fragmentary longitudinal section through one end portion of a vehicle axle embodying my invention; and Fig. 2 is a similar view illustrating a modification.

Referring now, to Fig. 1 of the drawing, the axle comprises a solid metal intermediate portion 1 to which is attached the ordinary axle wood 2 through the medium of a suitable metal clip 3 in the usual and well known manner. This intermediate portion 1 is preferably flattened throughout its length and is provided at its ends with cylindrical enlargements 4 which are shouldered and screw-threaded to receive the counterpart inner end portion of a spindle-sleeve or tubular extension 5.

The outer end portion of the spindle-sleeve or tubular extension 5 is reduced to receive the inner bearing sleeve or ring 6 of an antifriction bearing, while in the hub of the wheel is fitted the outer ring 7 for said antifriction bearing. The inner bearing ring is provided with an anular peripheral groove which constitutes a raceway for a series of antifriction rollers 8; and it is also provided with a groove to receive a series of balls 9. The rollers 8 are provided to carry the weight, while the balls 9 are primarily provided to receive the end thrust.

Extending into the tubular extension 5 is a spindle or shank 10 having a circular enlargement or head 11 at its outer end, which is screw-threaded into the outer portion 12 of the hub of the wheel or otherwise rigidly secured to the hub. The spindle or shank 10 is bored axially and the bore is preferably of two diameters, the diameter of the inner portion being the larger. In the larger bore is slidably and rotatably fitted a cylindrical bar or thrust-block 13 having a tapered inner end portion 14 which fits into a counterpart central perforation in a bearing ring 15. The bearing ring 15 is fitted in a counterbore of the tubular extension 5 with a slight clearance between it and the face of the counterbore. Opposed to this bearing ring is a second bearing ring 16 which is preferably fitted tightly in the counterbore of the tubular extension 5 and abuts against the end portion 4 of the intermediate section of the axle. The adjacent faces of the two bearing rings 15 and 16 are provided with coöperating annular grooves or raceways for a series of balls 17.

In the smaller bore of the spindle 10 is slidably fitted a rod 18 which bears at its inner end against the thrust-block 13, while its outer end projects into a counterbore 19 in the outer end of the spindle. The counterbore 19 is screw-threaded to receive a plug 20 adapted to bear at its inner end against the outer end of the rod 18. This plug 20 is preferably provided with a squared portion 21, or it may be otherwise arranged to receive a wrench or other tool whereby the plug may be turned.

Preferably, the tubular extension 5 is externally grooved to receive a guard or ring 22 which coöperates with the inner portion 23 of the hub of the wheel, so as to exclude dust and grit, and also retain the lubricant within the bearings. As oil supply opening 24 is provided in the tubular extension 5, preferably, adjacent to the inner end of the spindle 10. This opening 24 is also preferably closed by a spring-pressed conical plug or closure 25.

By securing the spindle member 10 rigidly to the hub of the wheel at its outer end, and extending the spindle into the tubular extension 5 of the axle for a considerable distance and providing a supporting and thrust bearing for the inner end portion of the spindle, the wheel will run without wabbling. The construction obviates the necessity of providing an elongated or relatively wide wheel hub and also obviates the necessity of providing antifriction bearings for each end of the hub. By adjusting the screw-plug 20 inwardly against the end of the rod 18, which in turn bears against the thrust-block 13 whose inner end portion is fitted in the bearing ring 15, the spindle 10 is moved outwardly and, owing to the connection between the spindle and hub of the wheel, the hub is also moved outwardly. By this arrangement the antifriction bearing in the hub of the wheel may be adjusted to a nicety, so that there is practically no play between the coöperating shoulder 7ª of the outer bearing ring 7 and balls 9 which work in the raceway provided in the inner bearing ring 6. Thus, the rattling of the bearing is eliminated and shocks or torsional strains liable to shatter the bearing rollers or balls are effectually resisted.

In Fig. 2, the hub of the wheel is provided with a bearing ring 26 having a tapered bore into which is fitted a conical bearing sleeve 27 on the tubular axle extension 5, in lieu of the antifriction bearing illustrated in Fig. 1. In this modification, also, the tubular extension 5 and the intermediate portion 1 of the axle are made integral. In the inner end of the bore of the tubular extension 5 is fitted a hardened metal block 28 in which the conical portion 14 of the thrust-block 13 is rotatably fitted. In other respects the construction is the same as that illustrated in Fig. 1 and the action of the device is the same.

Obviously, the device admits of considerable modification without departing from my invention. Therefore, I do not wish to be limited to the exact construction and arrangement shown.

What I claim is:

1. The combination with an axle having a tubular end portion, of a wheel hub journaled on said tubular end portion of the axle, a spindle rigidly connected at its outer end to the hub of the wheel and extending into said tubular end portion of the axle, said spindle having an axial bore, a thrust-block slidably fitted in the axial bore of said spindle, a bearing in said tubular end portion of the axle adapted to support said thrust-block rotatably and also resist end thrust thereof, and means for adjusting said thrust-block in the spindle whereby the end play in the hub bearing is taken up.

2. The combination with an axle having a tubular end portion, of a wheel hub journaled on said tubular end portion of the axle, a spindle rigidly secured at its outer end to the hub of the wheel and extending into the tubular end portion of the axle, said spindle being bored axially, a cylindrical thrust block in said axial bore of the spindle, a bearing in said tubular end portion of the axle adapted to support said thrust block rotatably and being also adapted to resist end thrust thereof, and a device movable longitudinally in the axial bore of said spindle and adapted to bear against said thrust block therein, said device being held by an adjustable manipulating device at the outer end of said spindle.

3. The combination with an axle having a tubular end portion, of a wheel hub journaled on said tubular end portion of the axle, a spindle rigidly secured at its outer end to the hub of the wheel and extending into the tubular end portion of the axle, said spindle being bored axially, a cylindrical thrust block in said axial bore of the spindle, a bearing in said tubular end portion of the axle adapted to support said thrust block rotatably and being also adapted to resist end thrust thereof, a thrust rod in the axial bore of said spindle bearing at its inner end against said thrust block therein, and a screw plug in the outer end portion of said spindle bearing at its inner end against the thrust rod, whereby the spindle may be adjusted endwise so as to take up end play in the respective bearings.

4. The combination with an axle having a tubular portion, of a wheel hub journaled on the outer extremity of said tubular portion of the axle, said wheel hub having a screw-threaded annular outer end portion, a spindle extending into said tubular portion of the axle and having a screw-threaded circular enlargement at its outer end adapted for rigid engagement with said screw-threaded hub portion, said spindle having an axial opening therethrough, a longitudinally movable thrust member fitted in said axial opening and projecting beyond the inner end of said spindle, a bearing in said tubular axle portion adapted to rotatably support said thrust member and also resist end thrust thereof, and means coöperating with said thrust member to move the spindle endwise to take up end play in the respective bearings.

5. The combination with an axle having a tubular portion, of a wheel hub journaled on the outer extremity of said tubular portion of the axle, a spindle extending into said tubular portion of the axle and having a head or enlargement at its outer end adapted for detachable but rigid engagement with the outer end of the wheel hub, said spindle having an axial opening therethrough, a longitudinally movable thrust member fitted in said axial opening and projecting beyond the inner end of said spindle, a bearing in said tubular axle portion adapted to rotatably support said thrust member and also resist end thrust thereof, and means coöperating with said thrust member to move the spindle endwise to take up end play in the respective bearings.

Signed at St. Louis, Missouri, this 7th day of March, 1911.

ONESIME E. MICHAUD.

Witnesses:
G. A. PENNINGTON,
PAULINE AMBERG.

Copies of this patent may be obtained for five cents each, by addressing the "Commissioner of Patents, Washington, D. C."